United States Patent [19]
Kleider et al.

[11] Patent Number: 5,940,439
[45] Date of Patent: *Aug. 17, 1999

[54] METHOD AND APPARATUS FOR ADAPTIVE RATE COMMUNICATION SYSTEM

[75] Inventors: John Eric Kleider, Scottsdale; Clifford Allan Wood, Tempe; William Michael Campbell, Phoenix, all of Ariz.

[73] Assignee: Motorola Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/806,783

[22] Filed: Feb. 26, 1997

[51] Int. Cl.$^6$ .............................. H04B 17/00; H04B 3/46; H04Q 1/20

[52] U.S. Cl. .................. 375/225; 375/240; 375/358; 375/259; 455/126; 455/69; 455/67.1

[58] Field of Search ................... 375/285, 296, 375/254, 346, 348, 224, 225, 227, 228, 260, 240, 242, 265, 221, 358; 455/63, 67.3, 226.1, 226.3, 296, 126, 69, 67.1; 371/5.1; 370/249; 714/204; 704/200, 201

[56] References Cited

U.S. PATENT DOCUMENTS

| | | |
|---|---|---|
| 4,672,657 | 6/1987 | Dershowitz . |
| 4,756,007 | 7/1988 | Qureshi et al. ............................ 375/37 |
| 4,991,184 | 2/1991 | Hashimoto .................................. 375/8 |
| 5,091,945 | 2/1992 | Kleijn ........................................ 381/36 |
| 5,265,128 | 11/1993 | Widmer et al. . |
| 5,313,495 | 5/1994 | Kim . |
| 5,325,397 | 6/1994 | Scholz et al. ............................. 375/10 |
| 5,430,743 | 7/1995 | Marturano et al. ....................... 371/43 |
| 5,432,816 | 7/1995 | Gozzo ...................................... 375/232 |
| 5,528,581 | 6/1996 | De Bot . |
| 5,533,067 | 7/1996 | Jamal et al. ............................. 375/341 |
| 5,541,955 | 7/1996 | Jacobsmeyer ........................... 375/222 |
| 5,544,156 | 8/1996 | Teder et al. . |
| 5,606,599 | 2/1997 | O'Mahony et al. ..................... 379/93 |
| 5,621,723 | 4/1997 | Walton, Jr. et al. . |
| 5,623,511 | 4/1997 | Bar-David et al. ..................... 375/207 |
| 5,657,356 | 8/1997 | Ozaki ...................................... 375/346 |
| 5,657,422 | 8/1997 | Janiszewski et al. ................. 395/2.37 |
| 5,687,198 | 11/1997 | Sexton et al. ........................... 375/347 |
| 5,701,294 | 12/1997 | Ward et al. ............................. 370/252 |
| 5,710,797 | 1/1998 | Segal et al. ............................. 375/346 |
| 5,715,277 | 2/1998 | Goodson et al. ....................... 375/222 |
| 5,727,032 | 3/1998 | Jamal et al. ............................ 375/347 |
| 5,754,599 | 5/1998 | Ling et al. .............................. 375/340 |

OTHER PUBLICATIONS

An article entitled "Combined Source and Channel Coding for Variable–Bit–Rate Speech Transmission", by D. J. Goodman and C. E. Sundberg, *The Bell System Technical Journal*, vol. 62, No. 7, Sep. 1983, pp. 2017–2036.

An article entitled "Variable Rate Speech and Channel Coding for Mobile Communication", by E. Yuen, P. Ho and V. Cuperman, *IEEE*, 1994, pp. 1709–1713.

*Primary Examiner*—Chi H. Pham
*Assistant Examiner*—Jean B Corrielus
*Attorney, Agent, or Firm*—Gregory J. Gorrie; Frank J. Bogacz

[57] ABSTRACT

A system is disclosed for an adaptive rate voice system to provide improvements in coded operation over changing communication channel (50) conditions. This adaptive rate system efficiently determines optimal voice/channel coding rates, coding strategies and modulation/demodulation for optimum voice quality and intelligibility. A system state estimator (100), channel status estimator (110) and channel status monitor (120) provides feedback in the system to optimize the communication channel. The system maintains a continuous link despite changing channel conditions and minimizes delays through the system. Even though simple in design, it provides relatively low complexity and powerful channel coding operation. Operating conditions are thus extended for CDMA and portable communication systems. Voice intelligibility is preserved in extremely noisy or even hostile channel conditions.

4 Claims, 4 Drawing Sheets

METHOD AND APPARATUS FOR ADAPTIVE RATE COMMUNICATION SYSTEM

BACKGROUND OF THE INVENTION

The present invention pertains to communication systems and more particularly to adaptive rate voice communication systems.

Present day digital voice communication systems are subject to degraded speech quality for changing channel conditions because of large variations in digital performance parameters such as bit error rate or received bit energy to noise density ratio. Such systems are only usable over a slight range of these varying channel conditions.

In a fixed aggregate rate system the source and channel coding rates are allowed to vary, but the whole sum of the voice coding bit rate plus the channel coding bit rate is constant. Thus, if the aggregate rate is fixed, the sum of the rates of the source and channel coding is equal to the aggregate channel rate. The prior art discloses the use of a variable rate speech and a variable channel coding rate, but at a fixed aggregate channel rate, the sum of the speech (source) bit rate and the channel coding rate always being fixed. In addition, such prior art systems also use a fixed modulation method.

Channel conditions include such parameters as: speech quality, intelligibility, the signal-to-noise ratio (S/N), symbol error rate (SER) and bit error rate (BER) of the transmitted and received signal. In typical wireless communication systems, degradation of the communication channel conditions may inhibit quality communication or may prevent communication at all.

Link margins of such communication channels experience long and short duration deep fading that distorts or inhibits communication. Such prior art voice systems are only usable over a slight range of these varying channel conditions. Similar conditions can occur for image transmission, digital data and other communication systems in addition to voice coding systems.

Accordingly, it would be advantageous to have an adaptive rate communication system that maintains a continuous link despite changing channel conditions and provides a relatively low complexity and powerful channel coding operation while being simpler in design and minimizing delays through the communication system.

DESCRIPTION OF THE PREFERRED EMBODIMENT

In accordance with the present invention, a novel method and apparatus for an adaptive rate communication system for optimal voice coder speech quality and intelligibility is shown.

The basic system accepts an audio input from a data source such as original speech from a person. A voice coder or vocoder then converts the audio input to a digital form. Next, a channel coder processes the digitized audio to give forward error control or FEC and interleaving. This digitized audio is then modulated by a modulator and transmitted over a suitable communication channel to a receiver for demodulation.

The demodulator, channel decoder/de-interleaver and voice decoder of the receiver reconstruct the digitized audio. This is provided to some data sink as the reconstructed speech. Current state of the art vocoder systems use fixed aggregate rates for the transmitter. The channel coding FEC bit rate plus the vocoder rate is a fixed quantity. The novel system varies the modulation, FEC, and voice coder rate to achieve optimal channel operating conditions.

Variation of the modulation method is central since this achieves considerable gain in the system capability. Digital transmitted speech can withstand bit-error-rates (BER) of approximately 0.1 to 1 percent and still be of good quality. At this BER, coding gains for typical FEC systems can be less than gains from switching modem rates.

Complex FEC requires more computation than modulation changes. Thus switching modulation lowers the requirements of the system. Switching is based on an objective measure of the distortion in the data.

The current objective measure of speech quality or speech distortion indicator is based on a function of the vocoder parameters including spectral distortion, coding probability errors, pitch distortion, decision bit errors, gain distortion and others measures that could be added by those skilled in the art. This optimal vocoder system minimizes channel errors with minimal equipment additions.

Figure 1:
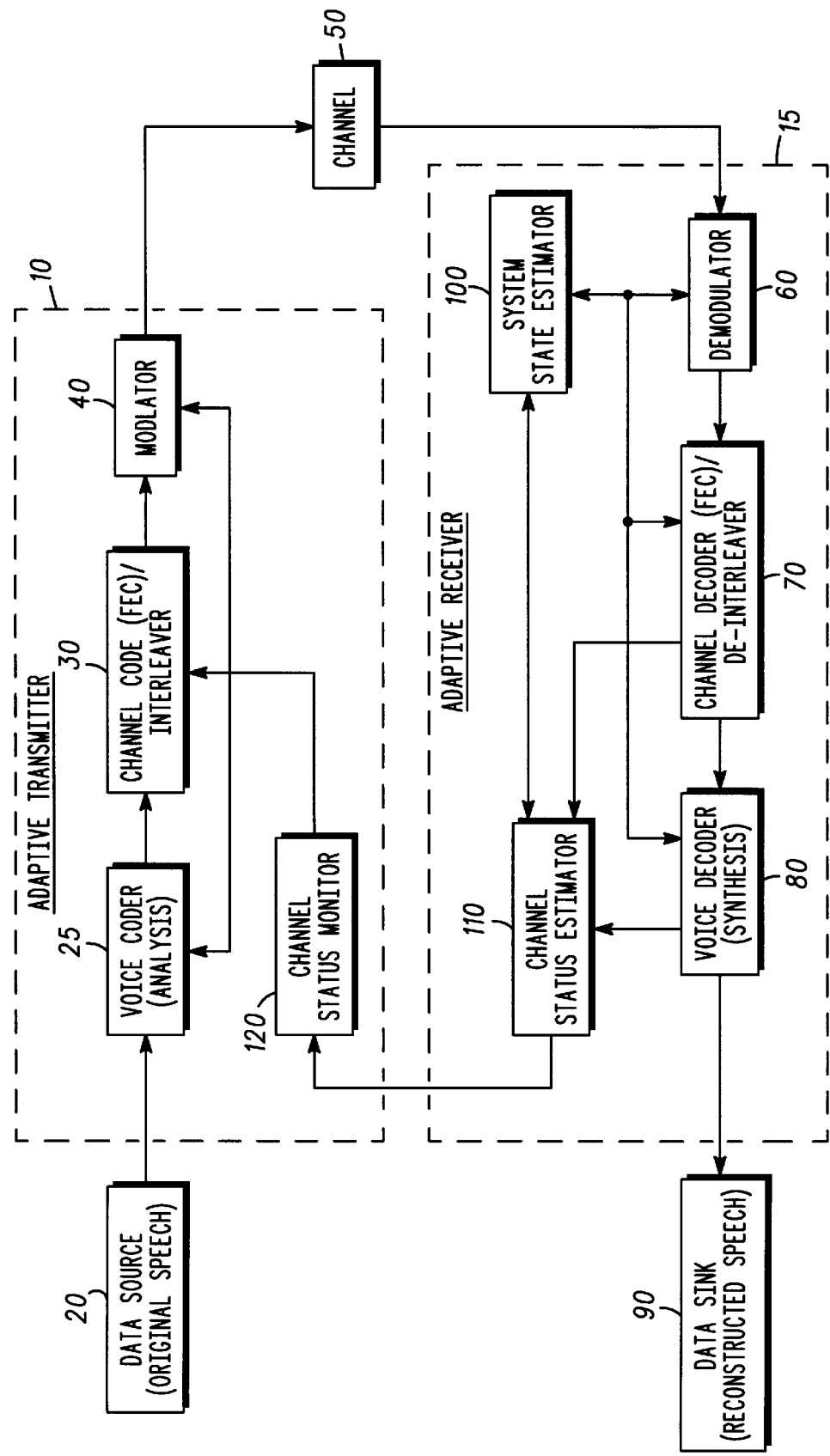
FIG. 1 is a block diagram depicting an adaptive rate communication system such as a voice coder system in accordance with the present invention.

Referring to FIG. 1, a block diagram of a typical voice communication system architecture employing an adaptive technique is shown. An adaptive transmitter 10 provides signals to an adaptive receiver 15. The purpose of the operations implemented by the hardware in the block diagram is to extend the intelligibility and speech quality of a voice communication system. Improvements are for any set of audio communication channel conditions.

A data source of original speech 20 provides an input for the system, which is compressed by a voice coder or vocoder 25 and a channel coder/interleaver 30. An output digital signal is modulated by a modulator 40 and transmitted through a channel 50. The data receiver 15 has a demodulator 60 that provides the signal to a channel status estimator 110 as well as to the channel decoder/de-interleaver 70. A voice decoder or synthesizer 80 provides decompressing of the voice, which is then input to a data sink 90 as the reconstructed speech. The voice decoder 80 also produces a spectral distortion indicator to the channel status estimator 110.

The coded data word starts with system status bits S(i) that are used to control the transmitter and receiver states to optimize the voice transmission. The initial bit is coded to indicate if the transmitter has changed state. If the transmitter state has been changed, the next bits provided a coded new state indicator for changing the receiver to the optimum transmitter state.

If the transmitter state has not been changed, the next bits transmitted after the initial bit are speech bits. This results in increased efficiency in the channel. Based on the symbol data rate of the modem, critical operating points ($OP_{crit}$) are computed by the system state estimator 100 and coupled to the channel 50. The state estimator operation is dynamically adjusted based on the operating parameters. The channel status monitor function 120 updates the $OP_{crit}(i)$ to $OP_{crit}(i+1)$.

These critical operating points, $Op_{crit}(i+1)$, determine the optimum voice coding rate in voice coder 25, channel coding rate and channel coding strategy in channel coder/interleaver 30, and modulation/demodulation process in modulator 40, communication channel 50, receiver demodulator 60, channel decoder/de-interleaver 70, and voice decoder 80. The system state estimator dynamically determines operating parameters and continuously/dynamically adjusts operation of the receiver and transmitter.

Present state of the art vocoder systems have a fixed symbol rate, so that the optimum operating parameters can A-only provide a voice quality for a mild change in the communication channel conditions. If the channel conditions change sufficiently, the previous operating parameters are no longer optimal for providing the maximum speech quality possible given the new set of channel conditions.

In the present invention, new critical operating points are determined in the system state estimator 100 so the system can operate optimally for current channel conditions. The system is adaptive to varying communication channel conditions such that the optimal speech quality and intelligibility is obtained.

Channel status is defined as the state of the channel that requires critical operating points. Status is denoted as $OP_{crit}(i)$, for optimal speech quality and intelligibility for the $i^{th}$ channel condition.

The channel status estimator 110 measures the quality, signal to noise ratio (S/N), and symbol error rate (SER) or bit error rate (BER) of the received signal. The value of the $OP_{crit}(i)$ parameter determines the condition (or status) of the voice communication channel.

The critical operating points are determined according to the communication system's BER (or SER) versus the S/N and bit sensitivity performance. Thus, as the channel status changes, so must the critical operating points $OP_{crit}(i)$.

The initial state of the system can be set at a reasonable expected channel condition, based on the average signal quality, S/N, and BER (or SER) measured during operational testing of the system in the field or under expected operational conditions.

The initial state is set by the transmitter 10, sent through the channel as a state indicator and decoded by the system state estimator 100 in the receiver 15. The system state estimator then outputs the critical operating points for the system at the current channel condition. The state is a result of the transmission, and is denoted as $OP_{crit}(i)$. All of the encoding and decoding processes are based on the $OP_{crit}(i)$.

The adaptive receiver constantly monitors the received signal quality, S/N, the speech objective quality measure, and BER (or SER) and responds by way of a feedback channel to the adaptive transmitter's channel status monitor.

If the channel statistics have been determined to have changed significantly enough, the channel status monitor 120 at the transmitter then computes a new set of critical operating parameters for the system. This means that $OP_{crit}(i) \neq OP_{crit}(i+1)$, where if the channel statistics were determined not to have changed significantly, $OP_{crit}(i)$ would be very similar or equal to $OP_{crit}(i+1)$. The magnitude of the change in the channel statistics will thus determine which critical parameters change and to what degree of change is required.

Figure 2:
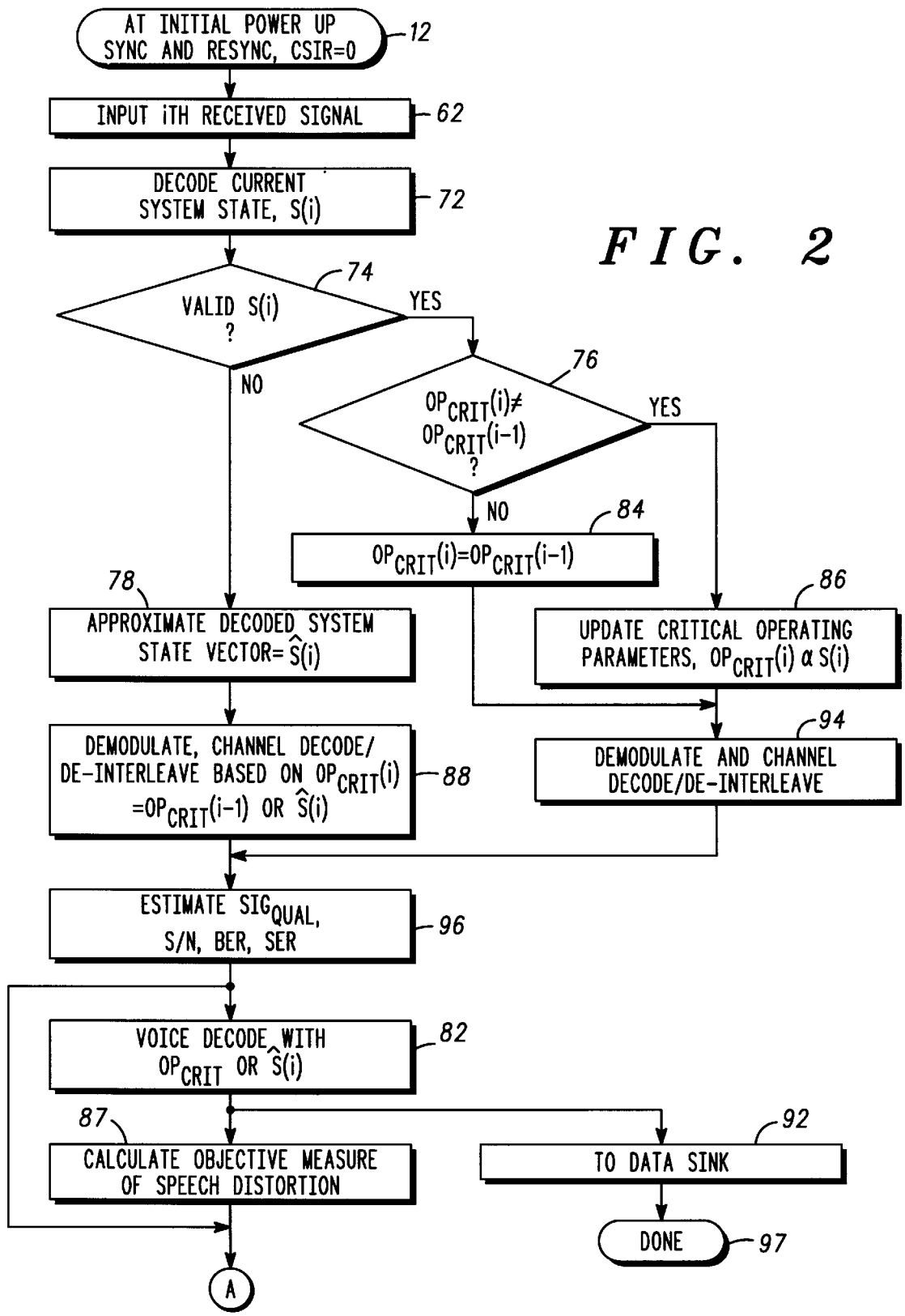
FIG. 2 is a portion of a receiver flowchart depicting the adaptive technique for an adaptive rate communication system in accordance with the present invention.
Figure 3:
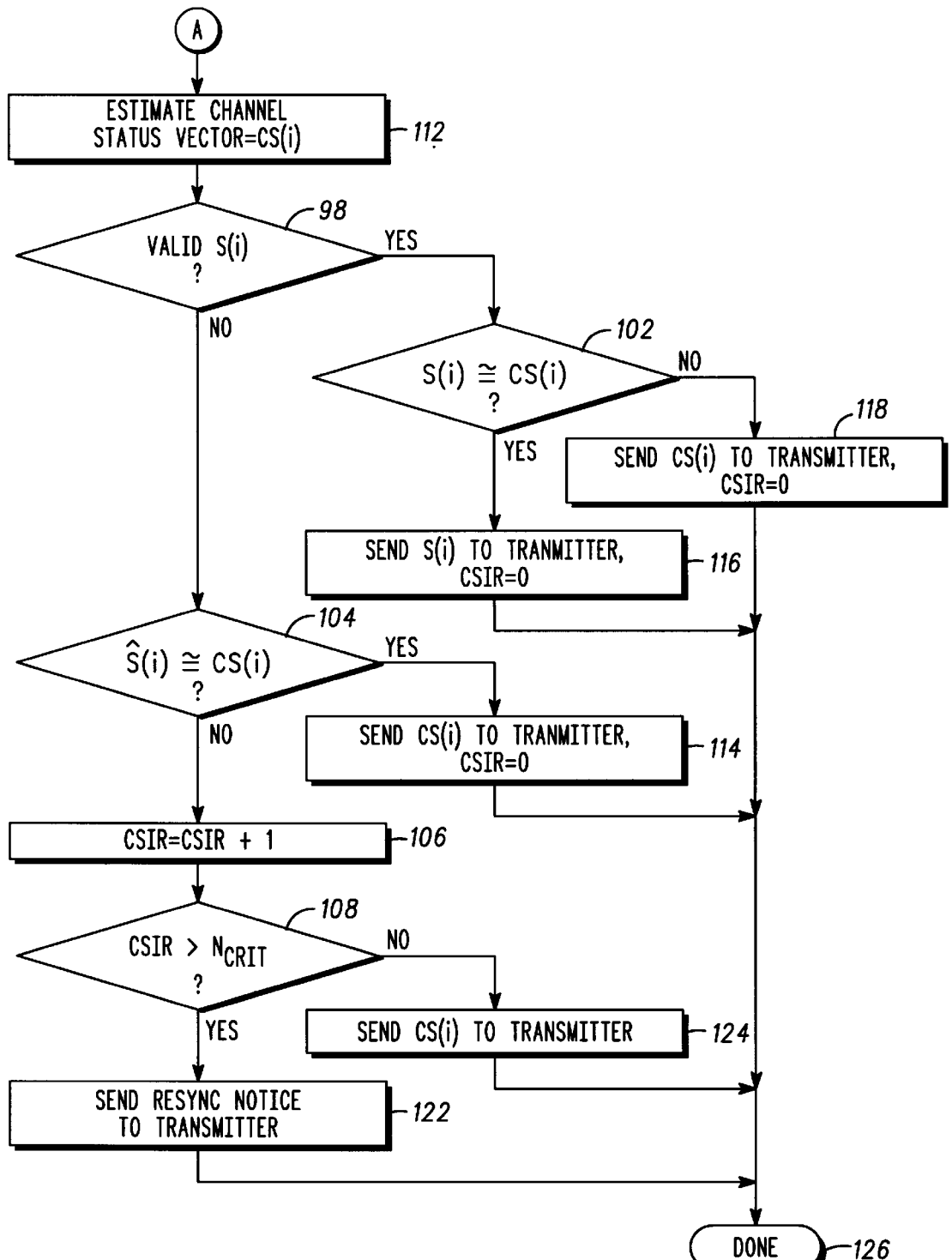
FIG. 3 is the other portion of the receiver flowchart depicting the adaptive technique for an adaptive rate communication system in accordance with the present invention.
Figure 4:
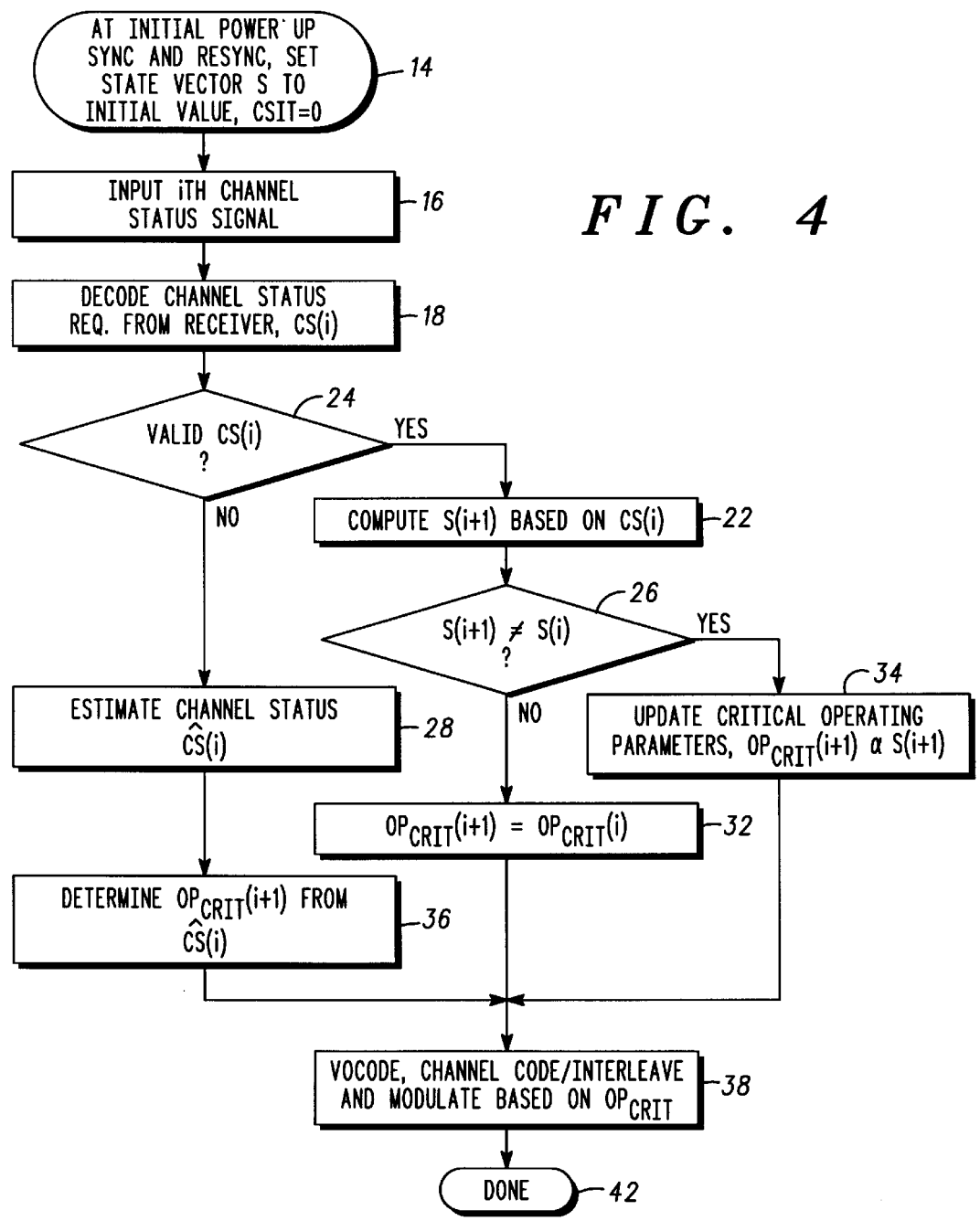
FIG. 4 is a transmitter flowchart depicting the adaptive technique for an adaptive rate communication system such as a voice coder system or vocoder in accordance with the present invention.

FIG. 2 and 3 provide the flow diagram for one implementation of the software for an optimal voice decoder receiver in the present invention. FIG. 4 provides the flow diagram for one implementation of the software for an optimal voice coder transmitter in the present invention.

Referring to FIG. 2 for the receiver, the voice decoder system is initially synchronized, block 12, with the channel state vector or channel state indicator equal to zero, csir=0. The ith received signal is input (block 62) to the receiver and then decoded in block 72 to provide the current system state indicator S(i). The system state indicator S(i) is evaluated by the system state estimator to determine validity, block 74. If it is valid (Y=yes), the critical operating parameters are compared to the previous one, $OP_{crit}(i)$ is compared to $OP_{crit}(i-1)$ at block 76. Unequal parameters (N=no) results in the $OP_{crit}(i)$ being updated to reflect the present S(i), block 86 and is used to demodulate and channel decode/de-interleave the received coded signal, block 94. For equal $OP_{crit}(i)$ parameters in block 76, the $OP_{crit}(i-1)$ is not changed from $OP_{crit}(i)$, in the block 84 and is used to demodulate and channel decode/de-interleave the received signal, block 94.

If the system state S(i) in block 74 is not valid, the system determines an approximate decoded system state vector $\hat{S}(i)$, block 78. This provides an approximate new state indicator. The receiver then demodulates and channel decodes/de-interleaves the data based on $OP_{crit}(i)$ equal $OP_{crit}(i-1)$ or $\hat{S}(i)$, block 88.

The receiver then estimates the signal quality, $(SIG_{qual})$, signal to noise (S/N) ratio, BER, and SER, in block 96. The voice decode or synthesis is performed with $OP_{crit}(i-1)$ or $\hat{S}(i)$, block 82 and input to the data sink, block 92, which completes the receiver decoding, block 97.

An objective measure of speech quality is then determined, block 87. This is used as the input A to FIG. 3 for continuation of the receiver flow diagram. Referring to input A on FIG. 3, the channel status vector or channel state indicator CS(i) is estimated, block 112.

The S(i) is evaluated in the receiver, block 98, to determine the validity of the system state, S(i). If S(i) is valid, it is compared to the CS(i), block 102. If the two are not approximately equal, then CS(i) is sent to the transmitter and the counter csir is set equal 0, block 118. If the two are approximately equal, then S(i) is sent to the transmitter and csir=0, block 116.

If S(i) in block 98 is not valid, then $\hat{S}(i)$ is compared to CS(i), block 104. If approximately equal, then CS(i) is sent to the transmitter and the counter csir is set to zero or csir=0, as in block 114. If $\hat{S}(i)$ is not approximately equal to CS(i), block 104, then the csir counter is incremented or set csir=csir+1, which is block 106.

The counter is checked to determine if the counter has exceeded a predetermined limit or Block 108 compares if csir>Ncrit. If it is not, then block 124 sends CS(i) to the transmitter.

If csir is greater than Ncrit, in block 108, then a resynchronization signal is sent to the transmitter, block 122. In either case, this ends the processing in the receiver on the i th channel status symbol, block 126.

FIG. 4 provides one means of implementing the transmitter for the present invention. At initial power up/synch and re-synch, the state vector S is set to the initial value, and the csit counter is set to zero, or csit=o, block 14. The i th channel status symbol is input, block 16. Next the channel status required is decoded from the receiver, CS(i) in block 18 to determine if the transmitter needs to be changed.

The validity of the channel status, CS(i), is checked in block 24. If CS(i) is valid, then block 22 computes S(i+1)

based on the CS(i). Then the S(i+1) is compared to S(i), block 26. If they are not equal, then the transmitter updates critical operating parameters OPcrit(i+1) according to parameter S(i+1), block 34.

If the system state indicator has not changed, the critical parameters are the same, or if S(i+1)=S(i) then OPcrit(i+1) is equal to OPcrit(i), block 32. If the channel state indicator, CS(i) is not valid, block 24, an approximate channel status ĈS(i), block 28 is determined. Next an OPcrit is determined from ĈS(i), block 36.

Finally, voice code or vocode of the input, channel code/interleave and modulate based on the OPcrit, block 38 is performed. This ends the transmitter function, block 42, and provides the output on FIG. 1 for transmitter 10.

The output then is sent over the channel 50 of FIG. 1 to the receiver 15 for decoding as the i th received signal, block 62, on FIG. 2.

It will be noted that the invention can be applied to any digital data communication channel and is not limited to voice coding systems. Thus imagery, secure data or other digital communication could be improved by the optimal communication system of the present invention.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An adaptive voice coding communication system comprising a transmitter for transmitting voice coded signals through a communication channel, and a receiver for receiving the voice coded signals from the channel, wherein the transmitter comprises:
    a voice coder for compressing and digitizing audio signals from an audio source at a voice coding rate;
    a channel coder for encoding signals from the voice coder at a channel coding rate;
    a modulator for modulating and transmitting the voice coded signals provided by the channel coder at a symbol rate and modulation method; and
    a channel status monitor for changing the voice coding rate, the channel coding rate, the symbol rate and the modulation method in response to a channel status indicator provided by the receiver over a feedback channel, the transmitter providing system status bits to the receiver prior to changing the voice coding rate, the channel coding rate, the symbol rate and the modulation method, and
    wherein the receiver comprises:
        a demodulator for demodulating the voice coded signals at the symbol rate and a demodulation method that corresponds with the modulation method, the demodulator determining a symbol error rate from the received signal;
        a channel decoder for decoding signals provided by the demodulator at a channel decoding rate that corresponds with the channel coding rate, the channel decoder determining a bit error rate;
        a voice decoder for decompressing signals provided by the channel decoder and synthesizing audio signals in accordance with a voice decoding rate that corresponds with the voice coding rate, the voice decoder determining a spectral distortion indicator from the signals decoded by the channel decoder;
        a system state estimator for setting the symbol rate, demodulation rate, channel decoding rate, and voice decoding rate of the receiver in response to system status bits provided by the transmitter; and
        a channel status estimator for providing the channel status indicator to the transmitter's channel status monitor when a current channel state differs from a previous channel state, the system state estimator coupled to the channel status estimator and determining the current channel state by computing a new symbol rate, demodulation rate, channel decoding rate, and voice decoding rate from the symbol error rate, bit error rate, and spectral distortion indicator.

2. A system as claimed in claim 1 wherein the transmitter provides initial system status bits to the system state estimator over the communication channel, the initial system status bits instructing the system state estimator to set an initial symbol rate, demodulation rate, channel decoding rate, and voice decoding.

3. A method of communicating voice coded signals through a communication channel comprising the steps of:
    in a transmitter:
        compressing and digitizing audio signals from an audio source at a voice coding rate;
        encoding the compressed and digitized audio signals at a channel coding rate;
        modulating and transmitting the encoded signals at a symbol rate and modulation method;
        changing the voice coding rate, the channel coding rate, the symbol rate and the modulation method in response to a channel status indicator provided over a feedback channel;
        providing system status bits to a receiver prior to changing the voice coding rate, the channel coding rate, the symbol rate and the modulation method,
    and in the receiver
        demodulating received voice coded signals at the symbol rate and a demodulation method that corresponds with the modulation method;
        determining a symbol error rate from the received voice coded signals;
        decoding the demodulated signals at a channel decoder;
        determining a bit error rate from the demodulated signals;
        decompressing signals and synthesizing audio signals in accordance with a voice decoding rate that corresponds with the voice coding rate;
        determining a spectral distortion indicator from synthesized audio signals;
        setting the symbol rate, demodulation rate, channel decoding rate, and voice decoding rate of the receiver in response to system status bits provided by the transmitter;
        providing the channel status indicator to the transmitter when a current channel state differs from a previous channel state; and
        determining the current channel state by computing a new symbol rate, demodulation rate, channel decoding rate, and voice decoding rate from the symbol error rate, bit error rate, and spectral distortion indicator.

4. A method as claimed in claim 3 further comprising the steps of:
    the transmitter providing initial system status bits over the communication channel; and
    setting an initial symbol rate, demodulation rate, channel decoding rate, and voice decoding in response to the system status bits.

\* \* \* \* \*